Oct. 5, 1926.

R. M. MANNING

LINE VALVE

Filed July 20, 1923

1,602,279

R. M. Manning
INVENTOR

BY Victor J. Evans
ATTORNEY

WITNESS:

Patented Oct. 5, 1926.

1,602,279

UNITED STATES PATENT OFFICE.

ROBERT M. MANNING, OF TULSA, OKLAHOMA.

LINE VALVE.

Application filed July 20, 1923. Serial No. 652,827.

This invention relates to valves and has for an object the provision of a valve especially adapted for use in pipe lines in oil fields, for controlling the flow of oil from the tanks.

Another object of the invention is the provision of a line valve which will permit free flow of oil when the line is open, but will prevent back pressure and will automatically close the line to keep out air after the tank has been emptied and the oil ceases to flow.

With the above and other objects in view, the invention further includes the following novel features and details of construction, to be hereinafter more fully described, illustrated in the accompanying drawings and pointed out in the appended claim.

In the drawings:—

Figure 1:
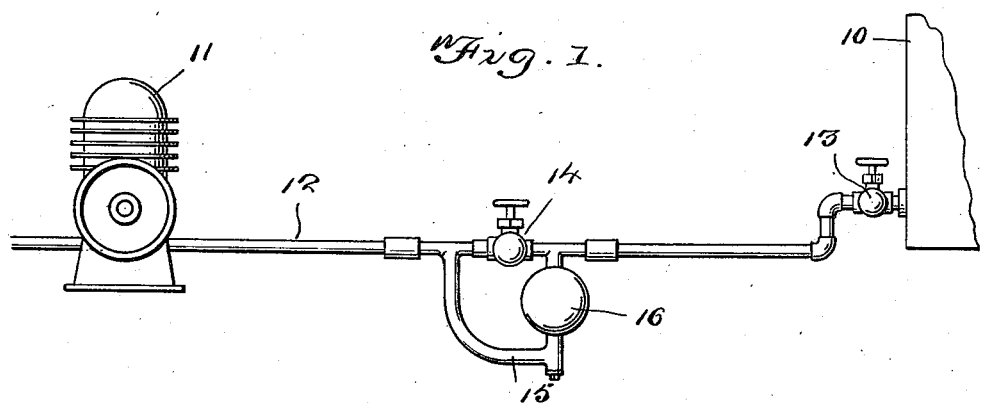
Figure 1 is a diagram illustrating the use of the invention.
Figure 2:
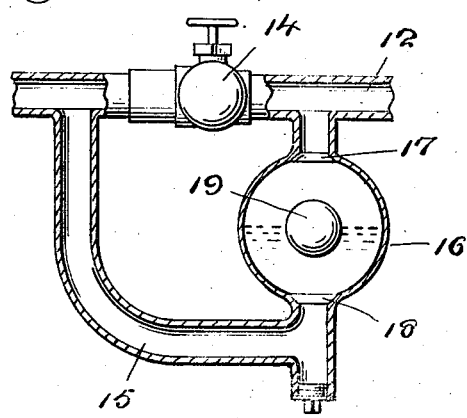
Figure 2 is an enlarged sectional view of the invention per se.

Referring in detail to the drawings wherein like characters of reference denote corresponding parts, the reference character 10 indicates a tank from which oil is adapted to flow by gravity and under the influence of a vacuum pump indicated at 11, a pipe or conduit 12 connecting the pump and tank. The pipe is provided adjacent the tank 10 with a manually operated valve 13.

Located within the pipe or conduit 12 is a manually operated valve 14 of suitable type which is adapted to be opened to permit flow through the pipe or conduit 12, while connected to this pipe and communicating therewith upon opposite sides of the valve 14 is a by-pass pipe 15. Included in the pipe 15 is a relatively large valve casing 16 which is provided with spaced valve seats 17 and 18, while located within the casing 16 is a float or valve member 19. This float or valve member may be formed of aluminum or other suitable material.

This invention is intended for use in field lines where the oil from a number of tanks runs out by gravity, the flow of oil being assisted by vacuum created by a suction pump located at a station on the receiving end of the line, this station being located at a lower level than are the tanks. The drawing only shows one tank, but it is understood that each tank is provided with a trap and all the lines are connected with the line to which the pump is connected at a point between the trap and the pump. When a tank is emptied, the air following the oil, will be prevented from entering the pump by the valve 19 seating itself on the lower seat 18 and the valve will be held on this seat through the suction created by the pump and by gravity. Then when the tank is refilled and is to be emptied again, the valve 13 is opened, as is also the valve 14. This opening of the valve 14 breaks the suction which holds the valve 19 on its seat 18 and then said valve 14 is closed again. Then the oil will flow from the tank into the casing 16, floating the valve 19, and passing from the casing through the pipe 15 into the pump line, the oil flowing by gravity and the suction created by the pump, as before explained. As soon as the tank is emptied, the air following the oil will be prevented from entering the system by the seating of the valve 19, as before explained. If oil pressure should occur in the pipe which connects the trap with the pump, due to the flow of oil from the other tanks, the valve 19 would be seated upon the upper seat 17 by this pressure and thus the oil from the other tanks would be prevented from entering the first tank and overflowing the same.

Thus the device has a two-fold purpose. It prevents air from getting into the pumping system and it also prevents back flow of oil from other tanks into the tank with which it is associated.

The invention is susceptible of various changes in its form, proportions and minor details of construction and the right is herein reserved to make such changes as properly fall within the scope of the appended claim.

Having described the invention what is claimed is:—

An apparatus of the class described comprising in combination with a conduit, a manually operated valve, a by-pass communicating with the conduit, upon opposite sides of said valve and a valve located within the by-pass, said valve embodying a relatively large casing, oppositely located spaced valve seats therein and a float located between and adapted to engage either of the seats to close the by-pass.

In testimony whereof I affix my signature.

ROBERT M. MANNING.